May 6, 1958  P. AUGUST  2,833,261
ACCESSORY DEVICE FOR USE IN INTERNAL COMBUSTION ENGINES
Filed Jan. 16, 1956  2 Sheets-Sheet 1
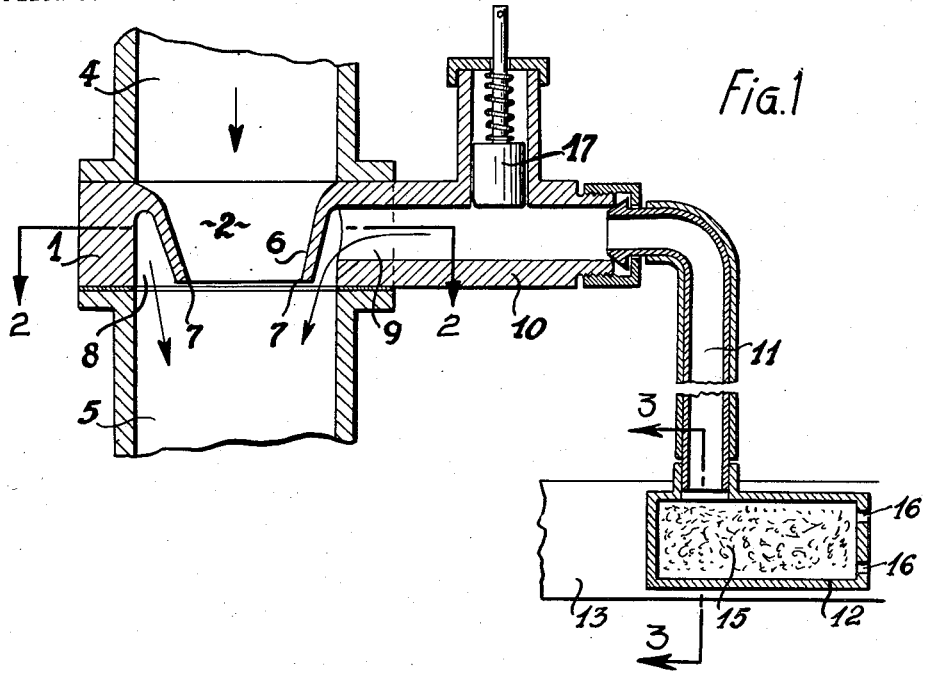
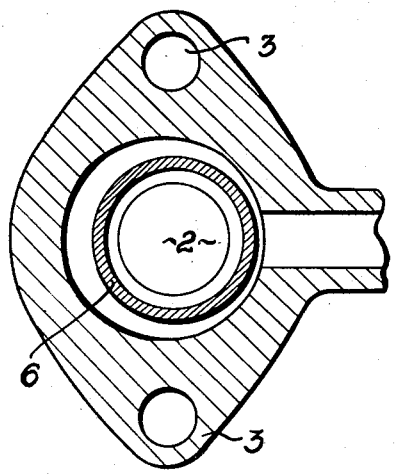
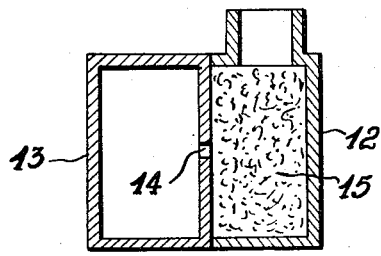
INVENTOR.
PABLO AUGUST
BY Toulmin & Toulmin
Attorneys May 6, 1958  P. AUGUST  2,833,261
ACCESSORY DEVICE FOR USE IN INTERNAL COMBUSTION ENGINES
Filed Jan. 16, 1956  2 Sheets-Sheet 2
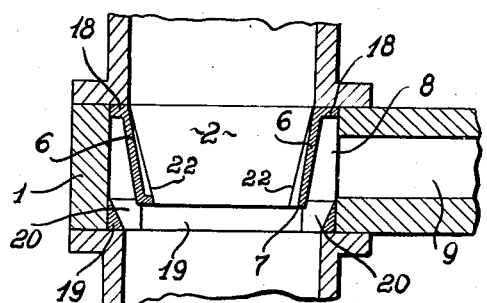
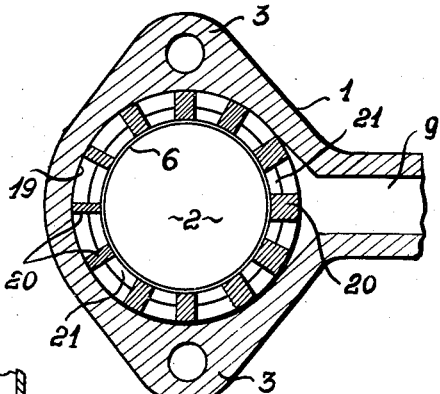
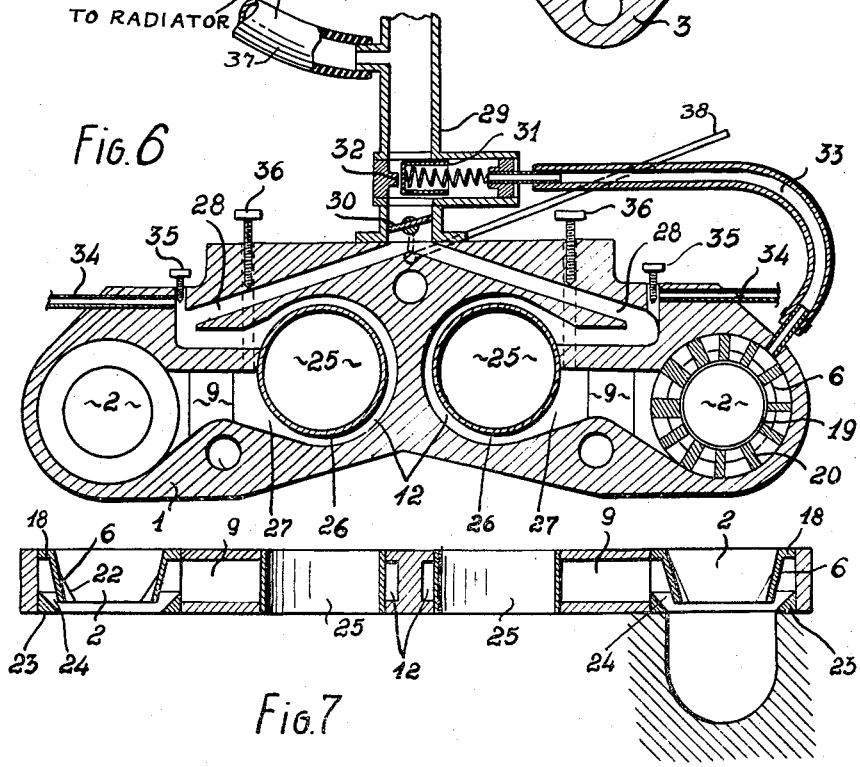
INVENTOR.
PABLO AUGUST
BY Toulmin & Toulmin
Attorneys

United States Patent Office

2,833,261
Patented May 6, 1958

2,833,261
ACCESSORY DEVICE FOR USE IN INTERNAL COMBUSTION ENGINES

Pablo August, Bernal, Argentina

Application January 16, 1956, Serial No. 559,338

Claims priority, application Germany October 18, 1955

10 Claims. (Cl. 123—122)

My present invention relates to certain useful improvements in internal combustion engines employing a carburetor for the supply of the fuel-air mixture required by the working cylinders.

It is well known that condensation of fuel on the carburetor wall cannot be avoided, that centrifugal forces likely to be developed in the bent portions of the fuel intake tend to deposit additional condensed fuel particles on the inner walls of said fuel intake, that the so formed fuel condensate entering the working cylinders produces an incomplete combustion with the results that the output of the engine is diminished, that deposits of carbonized oil are formed on the pistons, in the cylinder heads and on the valve bodies, that a perfect lubrication of the cylinder walls is rendered questionable and that the moving parts are subject to being soon worn out.

The main object of my invention is to at least in part eliminate the aforementioned drawbacks and to thereby ensure a practically complete combustion of the fuel, reduce the fuel consumption and improve the working conditions of the internal combustion engines, thus ensuring at the same time a longer life of such engines.

For the same purpose I already proposed to collect the fuel condensate, to submit the latter to a thermal treatment and gasification and to re-introduce the so elaborated condensate into the fuel-air mixture as directly drawn in from the carburetor. I also proposed to mix the collected fuel condensate with water vapour for the purpose of keeping the condensate-elaborating device clean of carbonized oil and forming water gas capable of increasing the octane number of the gasified fuel condensate and therewith of the final fuel-air mixture delivered to the working cylinder.

The further development of my works on this field have shown that good results may also be obtained, without collecting and thermally elaborating the fuel condensate according to my proposition, by simply causing, according to this invention, a current of hot air and/or water vapour to drag the fuel-condensate particles on their way from the carburetor to the working cylinder away from a contact breaking edge into the stream of fuel-air mixture from said carburetor and thereby simultaneously evaporating said particles.

In accordance herewith, my present invention provides a novel accessory device for use in internal combustion engines employing a carburetor, which is essentially characterized by comprising a perforated flat body capable of being interposed between the carburetor and the working cylinder, a cone-shaped member arranged within the perforation of said flat body in such a manner that its larger end is secured to the inner wall of the entrance opening of said perforation, whereas its smaller end forms a contact-breaking edge for the fuel condensate coming from the carburetor, an annular channel formed between said cone-shaped member and the inner wall of said perforation for the supply of a current of hot air and/or water vapour to said contact-breaking annular edge, and means for uniformly distributing said current over the circumference of said edge.

The accessory device according to the invention and as set forth in the preceding paragraph may be of different construction. The current of hot air is conveniently drawn in from the atmosphere through a heating chamber arranged in heat-exchanging relation to the exhaust pipe of the internal combustion engine, and, if desired, said heating chamber may be connected by way of a small conduit with the interior of the exhaust pipe for the purpose of mixing the air with a small proportion of exhaust gases. According to another embodiment of the invention, the air-supply means may be connected with a source of water vapour such as the radiator of the internal combustion engine. Finally, the accessory device according to the invention may be connected exclusively with such source of water vapour. By virtue of that at a temperature above 300° C. the water vapour becomes decomposed into hydrogen and oxygen and the so obtained hydrogen combines with carbon particles of the fuel into water gas, the supply of a water-saturated air or of water vapour is advantageous as it increases the octane number of the fuel-air mixture delivered to the working cylinders and improves the working conditions of the internal combustion engine. Since the said current of air is drawn in from the atmosphere, it always contains a certain percentage of moisture and the aforementioned improvement may be at least in part ensured by the supply of atmospheric air alone.

In as far as the construction of the accessory device is concerned, according to one embodiment of the invention, the cone-shaped member provided within the perforation of the said perforated flat body is eccentrically arranged therein in such a manner that the annular channel formed by the same has a relatively small cross sectional area at the entrance of the current of hot air and/or water vapour and that the cross sectional area of said channel gradually increases towards the point diametrically opposite said entrance, whereby a uniform distribution of the air and/or vapour over the entire circumference of the contact-breaking edge of said cone-shaped member is ensured with the advantageous result that the air and/or vapour forms a tubular curtain around the fuel air mixture drawn in from the carburetor through said cone-shaped member, drags the condensed fuel particles away from said contact-breaking edge, evaporates said particles and thus prevents the same from forming new condensate deposits on the inner wall of the fuel intake and of the working cylinders.

In the embodiment as hereinbefore referred to the said cone-shaped member has a smooth inner surface and the channel formed between its outer surface and the inner wall of the perforated flat body is entirely open at the free contact-breaking edge of said cone-shaped member.

According to another embodiment of my invention, the said cone-shaped member has its inner surface provided, with helical guide means capable of giving the fuel-air-mixture drawn in from the carburetor a rotary motion and in this case the annular channel formed between said cone-shaped member and the inner wall of the said perforated flat body is communicated with the contact-breaking edge by way of a number of perforations through an annular cross wall between said edge and the inner wall of said perforated flat body, said perforations extending in an inclined direction opposite the direction of said helical guide means and having a relatively small diameter at the entrance of the current of hot air and/or water vapour and a gradually increasing diameter towards the point diametrically opposite said entrance with the advantageous results that, on one hand, said current is uniformly distributed over the entire circumference of said contact-breaking edge and that, on the other hand, said current receives a rotary motion opposite the rotary motion of the fuel-air mixture thereby efficiently dragging away from said contact-breaking edge the condensed fuel particles, evaporating and re-introducing the same into said fuel-air mixture and at the same time mutually compensating said opposite rotary motions.

In accordance with still another embodiment of the invention, the said cone-shaped member is of substantially the same construction as hereinbefore referred to, but of a somewhat reduced length, and its free end forming the contact-breaking edge is supported by a ring member comprising a number of radial bridge pieces so arranged that as in the previously described embodiment the current of hot air and/or water vapour is not only uniformly distributed over the entire circumference of said contact-breaking edge, but that it also receives a rotary motion contrary to that of the fuel-air mixture drawn in from the carburetor with the advantageous results as above set forth.

According to one feature of the invention, the heating chamber through which the air is drawn in from the atmosphere is filled with a suitable filter material and is arranged in good heat-exchanging contact with the exhaust pipe of the internal combustion engine. In case said chamber is arranged at certain distances from the entrance of the annular channel of the device, the connection therewith is established by means of a heat-insulated pipe. Alternatively the arrangement may be such that the heating chamber is formed within the said perforated flat body and that exhaust gases are caused to pass through a tube member extending through said heating chamber.

According to another feature of the invention, the accessory device includes a valve means capable of controlling the supply of hot air and/or water vapour while the internal combustion engine operates without load or runs idly.

An additional object of my invention is to provide an accessory device for use in internal combustion engines as hereinbefore referred to, wherein the control of the supply of additional hot air and/or water vapour is effected by a throttle-valve operatively connected with the usual throttle valve of the carburetor or with the gas-control lever of the engine, in combination with a vacuum-controlled valve which by means of a stop member is prevented from entirely closing the inlet port wherein also said throttle valve is arranged, the casing of said vacuum-controlled valve being connected by a vacuum conduit with a fuel intake of the engine, so that the supply of the additional hot air and/or water vapour is additionally controlled by the vacuum produced in the engine.

Still another object of my invention is to provide an accessory device for use in internal combustion engines as hereinbefore referred to, wherein control screws are provided for changing the cross sectional areas of air-supply channels formed in the flat body of the device, with the advantageous results that a supply of additional air may be furnished and exactly regulated for the no-load operation of the engine and that the supply of additional hot air and/or water vapour may be additionally regulated for the outer working cylinders of a multi-cylinder engine in such a manner that all the cylinders receive a uniform fuel-air mixture.

With these objects and advantageous features in view my present invention comprises the arrangement, combination and construction of parts as will be hereinafter fully described with particular reference to the accompanying drawings, wherein by way of examples only several embodiments of the invention have been illustrated and wherein:

Figure 1 is a schematic sectional view of a first embodiment of the accessory device for internal combustion engines according to my invention;

Figure 2 is a detail sectional view along the line 2—2 of Figure 1;

Figure 3 is a detail sectional view along the line 3—3 of Figure 1;

Figures 4 and 5 illustrate a second embodiment of the invention in schematic vertical and horizontal sectional views respectively; and Figures 6 and 7 show the invention in schematic vertical and horizontal sectional views, respectively, as applied to a four-cylinder "Willys Jeep" internal combustion engine.

On the accompanying drawings like reference numerals indicate like or corresponding parts shown in different figures.

The accessory device for internal combustion engines according to my present invention in its embodiment as shown in Figures 1 to 3, comprises a perforated flat body 1 having a perforation 2 and lugs 3 for its interposition between the carburetor indicated at 4 and the fuel intake 5 of a working cylinder.

A cone-shaped member 6 is provided within the perforation 2 of the body 1, forming a contact-breaking edge 7 for condensed fuel particles traveling along the inner surface of the carburetor wall and of said cone-shaped member, and an annular channel 8 between the latter and the inner wall of the perforated flat body 1.

The cone-shaped member 6 as shown in Figure 1 forms an integral part of the body 1 extending from the edge of the entrance opening of its perforation 2 and having its free edge 7 situated at the level of the outlet opening of said perforation 2, at which the annular channel 8 is entirely open.

A lateral perforation 9 of the flat body 1 and of a lateral extension 10 of the latter communicates the channel 8 by way of a heat-insulated pipe 11 with a heating chamber 12. This chamber is arranged in good heat-exchanging relation to the exhaust pipe 13 and, if desired, is communicated with the interior of the exhaust pipe by means of an opening 14. Said chamber is conveniently filled with filter material 15 and has air-inlet openings 16 through which air is drawn in from the atmosphere. A spring-loaded valve 17 permits interrupting the current of hot air from the heating chamber 12 to the channel 8.

As clearly shown in Figures 1 and 2, the cone-shaped member 6 is eccentrically disposed within the perforation 2 in such an arrangement that the channel 8 has a relatively small cross sectional area at the entrance 9 and that this cross sectional area gradually increases towards a point diametrically opposite said entrance. This arrangement ensures a uniform distribution of the air over the entire circumference of the edge 7 of the cone-shaped member 6.

As will be readily appreciated the current of air drawn in by the working piston of a working cylinder through the heating chamber 12, pipe 11 and entrance 9 into the annular channel 8 forms a tubular air curtain on the inner wall of the fuel intake 5 which, at the one hand, drags away from the contact-breaking edge 7 any condensed fuel particles traveling along the inner surface of the cone-shaped member 6, evaporates these particles and prevents the same from forming a new fuel condensate on the inner wall of the fuel intake and, at the other hand, supplies the evaporated fuel particles with the oxygen required for their complete combustion so that deposits of carbonized oil in the working cylinder are avoided and that a complete combustion of the fuel with a higher output at lower fuel consumption of the engine is obtained.

In the embodiment as illustrated in Figures 4 and 5 the cone-shaped member 6 is provided with a flange 18 exactly fitting into the entrance opening of the perforation 2 of the flat body 1 and at its smaller end which forms the contact-breaking edge 7 is supported by a ring member 19. This ring member 19 is secured in place at the outlet opening of the perforation 2 and comprises a number of radial bridge pieces 20 which as clearly shown in Figure 5 are so arranged that the clearing spaces 21 between said bridge pieces are relatively small at the entrance 9 and gradually increase in size towards a point diametrically opposite said entrance 9 with the result that also in this case a uniform distribution of the air current admitted through the entrance 9 to the annular channel 8 over the entire circumference of the contact-breaking edge 7 is ensured.

In this embodiment the cone-shaped member 6 is conveniently provided at its inner surface with helical guide ribs or grooves 22 and the bridge pieces 20 are inclined so as to impart to the air current a rotary motion contrary to that which is imparted by said helical guide ribs or grooves to the fuel-air mixture drawn in from the carburetor. In this case the air current not only drags the condensed fuel particles away from the contact-breaking edge 7 and evaporates the same, but also re-introduces the evaporated fuel condensate into the fuel-air mixture and becomes itself thoroughly mixed with the latter, thus providing the working cylinder with a final mixture which ensures a perfect and complete combustion.

It will be understood that in the embodiment as shown in Figures 4, 5 a control valve as indicated at 17, Figure 1, is also provided for permitting the supply of hot air and/or water vapour to be interrupted when the internal combustion engine runs idly i. e. when the engine operates with the fuel supplied by the usual no-load system of the carburetor.

A further embodiment of my invention as applied to a four-cylinder "Willys Jeep" internal combustion engine has been illustrated in Figures 6, 7 wherein the cone-shaped member 6 is provided with an upper flange 18 and with a lower flange 23 fitting exactly into the perforations 2 of the flat body 1, and the head of the engine which in this case is interposed between the intake and exhaust manifold, and wherein the annular channel 8 communicates with the fuel intake 5 at the contact-breaking edge 7 of the cone-shaped member 6 by way of a number of perforations 24 provided in lower flange 23. In order to ensure a uniform distribution of the air from the channel 8 over the entire circumference of the contact-breaking edge 7, the diameter of the perforations 24 is relatively small at the entrance 9 and gradually increases towards a point of said channel diametrically opposite the entrance 9 as clearly shown in Figure 7.

As in the case of Figures 4 and 5, the inner surface of the cone-shaped member 6 in this further embodiment may also be provided with helical guide ribs or grooves 22 and the perforations 24 then extend in an inclined direction for imparting to the currents of air passing therethrough a rotary motion contrary to that imparted by said guide ribs or grooves to the fuel-air mixture drawn in from the carburetor through said cone-shaped member.

In this further embodiment according to Figures 6 and 7 the perforated flat body 1 is enlarged and comprises additional perforations 25 each containing a tube 26 forming part of the exhaust pipe of the engine and forming around the latter a heating chamber 12 which, at one hand, is connected by way of a conduit 27 and of the aforementioned entrance 9 with the annular channel and, at the other hand, with a channel 28 and by way of the latter with an inlet port 29 for the admittance of air and/or water vapour.

The inlet port 29 contains a throttle valve 30 which is operatively connected with the usual throttle valve of the carburetor or with the accelerator pedal of the engine by a rod 38 for controlling the supply of additional air independently of the gas supply.

The inlet port 29 itself is connected by way of the usual air filter of the engine or by way of an additional air filter with the atmosphere, eventually with the crankcase and preferably additionally with a source of water vapour, for instance, with the radiator of the engine by a conduit 37.

The inlet port 29 further comprises a spring-loaded vacuum-operated valve 31 which by means of a stop member 32 is prevented from entirely closing the inlet-port and the casing of which is connected by way of a vacuum conduit 33 with one of the fuel intake openings 2, so that the supply of hot air and/or water vapour is additionally controlled by the vacuum produced in the engine.

The flat body 1 conveniently comprises channels 34 connected with the air filter and provided with control screws 35 for the purpose of exactly regulating the supply of additional air to each cylinder for the no-load operation of the engine. In view of that particularly when the engine runs idly the combustion is most unfavourable, the addition of an exactly controlled quantity of hot air is of considerable importance.

It is a well known fact that in a multi-cylinder engine the cylinders arranged at greater distances from the carburetor receive a combustible mixture richer in fuel than the remaining cylinders situated nearer to the carburetor, this being due to the inertia of the fuel. In accordance with the invention, this disadvantage may be readily eliminated since by means of control screws 36 the cross sectional area of the channels 28 may be modified in such a manner that the cylinders situated at larger distance from the carburetor receive a larger quantity of additional air and that thus all the cylinders receive a substantially uniform fuel-air mixture.

In the embodiments of the invention as hereinbefore described and as shown on the accompanying drawings, a tubular curtain of hot air is produced on the inner wall of the fuel intake of each working cylinder, which drags the condensed fuel particles away from the said contact-breaking edge, evaporates said particles and mixes the evaporated fuel condensate with air and incorporates this additional mixture into the main fuel-air mixture drawn in from the carburetor. The formation of new condensate is avoided and the internal combustion engine receives a fuel-air mixture free of condensed fuel particles and uniformly mixed which ensures a lower fuel consumption without reducing the output of the engine.

Since condensed fuel particles do not enter the working cylinders, a dilution of the lubricating oil is effectively avoided. For the same reason deposits of carbonized oil are prevented from being formed on the pistons, in the cylinder heads and on the valve bodies and from affecting the lubrication of the cylinder walls.

An additional advantage ensured by this invention consists in that an internal combustion engine comprising a carburetor and being provided with the accessory device according to my invention has a considerably increased insensibility in as far as the octane number of the fuel is concerned. It is well known that a fuel vapour is more liable to spontaneous ignition than a fuel gas. Consequently, the fuel gas permits for a higher compression in a surface-ignition engine. Since in normal carburetor engines the deposits of carbonized oil also produce spontaneous ignition, it will be recognized that as in the case of a diesel engine the carburetor engine provided with the device according to this invention permits for a higher compression of the same fuel because of the absence of vapour and of carbonized-oil-forming fuel condensate. The possibility of increasing the compression ratio obtained by this invention results in a further reduction of the fuel consumption with a simultaneous increase of power.

Another important advantage of this invention consists in that it provides for the possibility of regulating the quality of the fuel-air mixture, such regulation being performed in diesel engines by the vacuum in the intake pipe in such a manner that the engine receives under lower load (higher vacuum) a mixture with less fuel than under a higher load. A like regulation of the quality of the fuel-air mixture is rendered possible in the device according to this invention by means of the vacuum-controlled valve 31 which closes the inlet port 29—except a small passage being kept open by the stop member 32—when the engine operates under full load and the vacuum produced in the engine is relatively small, whereas it opens said inlet port when the engine works under lower load and produces a relatively higher vacuum, the regulation of the quality of the fuel-air mixture thus being achieved by the supply of a larger or smaller quantity of additional air. The provision of the stop member 32 which prevents the inlet port 29 from being entirely closed and ensures that certain quantity of hot additional air may always pass therethrough, constitutes an important part of the invention, because, while the engine works under full load, the fuel condensate would not be elaborated if the supply of additional air would be entirely cut off.

Finally, in addition to the maintenance of good lubricating conditions, to the elimination of the formation of carbonized oil and to the reduction of the fuel consumption this invention ensures a decrease of the unhealthy carbon monoxide-formation by virtue of the complete combustion of the fuel.

The present invention is not intended to be restricted to the embodiments as described and illustrated because it will be readily understood that the uniform distribution of the current of hot air and/or water vapour from the annular channel 8 over the entire circumference of the contact-breaking edge 7 of the cone-shaped member 6 may also be obtained by means different from those as described and shown. Such different means and other modifications of details of form, construction and arrangements are, therefore, to be considered as falling within the scope of the invention as clearly outlined in the appended claims.

What I claim as new and desire to secure by Letters Patent is:

1. Accessory device for use in internal combustion engines employing a carburetor, comprising a perforated flat body capable of being interposed between the carburetor and the working cylinder, a cone-shaped member arranged within the performation of said flat body in such a manner that its larger end is secured to the inner wall of the entrance opening of said perforation, whereas its smaller end forms a contact-breaking edge for the fuel condensate coming from the carburetor and travelling along the inner surface of said cone-shaped member, an annular channel formed around the latter and communicated at said contact-breaking edge with the fuel intake of said working cylinder and by way of a lateral opening with a conduit means in said flat body for the supply of a current of hot air to said contact-breaking edge and for the formation of a tubular curtain of hot air on the inner surface of said fuel-intake, an air heating device connected with said conduit means, a throttle valve arranged in this conduit means and operatively connected with an accelerator of the engine, and a vacuum-controlled valve having its valve casing connected by a conduit means with said fuel intake of the working cylinder of the engine for regulating the quality of the fuel-air mixture admitted to said working cylinder.

2. Accessory device for use in internal combustion engines according to claim 1, wherein the said cone-shaped member has a smooth inner surface and is eccentrically arranged within the perforation of the said perforated flat body, the eccentric arrangement of said cone-shaped member being such that the said annular channel has a relatively small cross sectional area at the said lateral opening connected with the said conduit means in said perforated flat body and a gradually increasing cross sectional area towards a point of said channel diametrically opposite said lateral opening and that said annular channel is entirely open around the free contact-breaking edge of said cone-shaped member.

3. Accessory device for use in internal combustion engines according to claim 1, wherein the said cone-shaped member has its smaller end supported by a ring member comprising a number of radial bridge pieces so arranged that the clearing spaces between adjacent bridge pieces are relatively small at the lateral bore of the said perforated flat body and gradually increase towards a point of the said annular channel diametrically opposite said lateral bore.

4. Accessory device for use in internal combustion engines according to claim 3, wherein the said cone-shaped member is provided at its inner surface with helical guide means capable of imparting to the fuel-air mixture drawn in from the carburetor a rotary motion, and wherein the said bridge pieces of the ring member supporting the said cone-shaped member are so arranged as to impart to the current of air a rotatory motion in opposite direction.

5. Accessory device for use in internal combustion engines according to claim 1, wherein the said perforated flat body is provided with a second perforation containing a tube member forming part of the exhaust pipe of the engine, an annular chamber formed around said tube member constituting the said air-heating device and connected, at one hand, with the said annular channel formed by the cone-shaped member in the first perforation of said perforated flat body and, at the other hand, with an air intake port.

6. Accessory device for use in internal combustion engines according to claim 1, wherein the said annular channel formed by the cone-shaped member in the perforation of the said perforated flat body is connected through the said lateral bore by way of a heat-insulated pipe with a heating chamber arranged in good heat-interchanging relation to the exhaust pipe of the engine, filled with filter material and communicating with the atmosphere.

7. Accessory device for use in internal combustion engines according to claim 1, wherein the said conduit means for the supply of a current of hot air in addition to its connection with the said air-heating device has a pipe connection with a source of water vapour.

8. Accessory device for use in multi-cylinder internal combustion engines employing a carburetor according to claim 1, wherein the said flat body has a number of perforations in communication with the fuel intakes and with the exhaust openings, respectively, of the working cylinders of the engine, the said cone-shaped member being arranged as referred to in each perforation communicated with said fuel intakes, and a tube member being arranged within each of the remaining perforations and connected with said exhaust openings, and wherein annular chambers formed in said flat body around said tube members constitute the said air-heating device.

9. Accessory device for use in multi-cylinder internal combustion engines employing a carburetor according to claim 1, wherein the said flat body has a number of perforations in communication with the fuel-intakes and with the exhaust openings, respectively, of the working cylinders of the engine, wherein the said cone-shaped member is arranged as referred to in each perforation communicated with said fuel intakes and a tube member is provided within each of the remaining perforations and connected with each of said exhaust openings, wherein air-heating annular chambers are formed in said flat body around said tube members and these annular chambers are connected by channels formed in said flat body with a valve-controlled air-inlet port, and wherein control screws are provided in said flat body for regulating the cross sectional areas of said channels.

10. Accessory device for use in multi-cylinder internal combustion engines employing a carburetor according to claim 1, wherein the said flat body has a number of perforations in communication with the fuel intakes and with the exhaust openings, respectively, of the working cylinders of the engine, wherein the said cone-shaped member is arranged as referred to in each perforation communicated with said fuel intakes and a tube member is provided within each of the remaining perforations and connected with each of said exhaust openings, wherein air-heating annular chambers are formed in said flat body around said tube members and these annular chambers are connected by channels formed in said flat body with a valve-controlled air-inlet port, and wherein said channels are connected by additional channels of said flat body with the atmosphere and control screws are provided in said flat body for regulating the cross sectional area of said additional channels.

References Cited in the file of this patent
UNITED STATES PATENTS

| | | |
|---|---|---|
| 1,102,053 | Johnson | June 30, 1914 |
| 1,184,611 | Boucher | May 23, 1916 |